United States Patent
Dishlip et al.

(10) Patent No.: US 9,239,663 B1
(45) Date of Patent: Jan. 19, 2016

(54) HOVER ACTIVATION BASED ON INPUT DEVICE POINTER MOVEMENT

(75) Inventors: Jason E. Dishlip, Seattle, WA (US); Miles Hunter, Seattle, WA (US); Drew M. Stamps, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1119 days.

(21) Appl. No.: 13/283,286

(22) Filed: Oct. 27, 2011

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
CPC .............................. G06F 3/0481; G06F 3/0482
See application file for complete search history.

(56) References Cited

U.S. PATENT DOCUMENTS

2007/0136690 A1* 6/2007 MacLaurin ........... G06F 3/0482 715/822
2009/0228832 A1* 9/2009 Cheng ................... G06F 3/0482 715/810
2011/0161884 A1* 6/2011 Dugan .................. G06F 1/1626 715/843

OTHER PUBLICATIONS

Friedmand, Vitaly, "10 Usability Nightmares You Should be aware of", Sep. 27, 2007, Smashing Magazine, http://www.smashingmagazine.com/2007/09/10-usability-nightmares-you-should-be-aware-of/.*

* cited by examiner

*Primary Examiner* — Sara England
(74) *Attorney, Agent, or Firm* — Thomas Horsetemeyer, LLP

(57) ABSTRACT

Disclosed are various embodiments for hover activation based on movement by an input device pointer. A network page associated with a network site for display by a client is rendered for display, where the network page includes a first panel. A trajectory path of an input device pointer is determined based on movement of an input device pointer. A second panel in the network page is displayed according to the input device pointer hovering over an element in the first panel. The network page is modified according to a predetermined delay and according to a current position of the input device pointer.

21 Claims, 10 Drawing Sheets

HOVER ACTIVATION BASED ON INPUT DEVICE POINTER MOVEMENT

BACKGROUND

Users often interact with a content delivery system via a network on a client device, where users may, for example, manipulate a user interface on a client in the form of a network page encoded by the content system, where the user includes one or more panels containing various elements.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating the display of panels and sub-panels based on movement of an input device pointer such as, for example, a mouse pointer. In many instances, a user interface implemented in the form of a network page includes a panel with various elements. By placing or hovering an input device pointer over an element, users can invoke another panel (i.e., a sub-panel) that provides more selections/elements relating to that element. Such user interfaces are commonly offered by online retailers to facilitate electronic commerce.

Typically, when an element within a first, main panel is triggered via the hovering of an input device pointer over that element, information related to that element is shown in the form of a sub-panel, where the sub-panel may be shown to the right or left of the main panel containing the element. Depending on the path of the input device pointer, traversing from the main panel to the sub-panel on the right or left can cause unintentional triggering of other elements in the main panel located along the trajectory path of the input device pointer.

Various embodiments are disclosed whereby a network page is generated for display by a client, where the network page includes a first, main panel. As the user moves the input device pointer within the network page, the path of the input device pointer is monitored. A second, sub-panel is displayed in the network page according to the input device pointer hovering over an element in the first panel. Based on both the movement by the input device pointer and a delay period, the network page is updated. In the following discussion, a general description of the system and its components is provided, followed by a discussion of the operation of the same.

Figure 1:
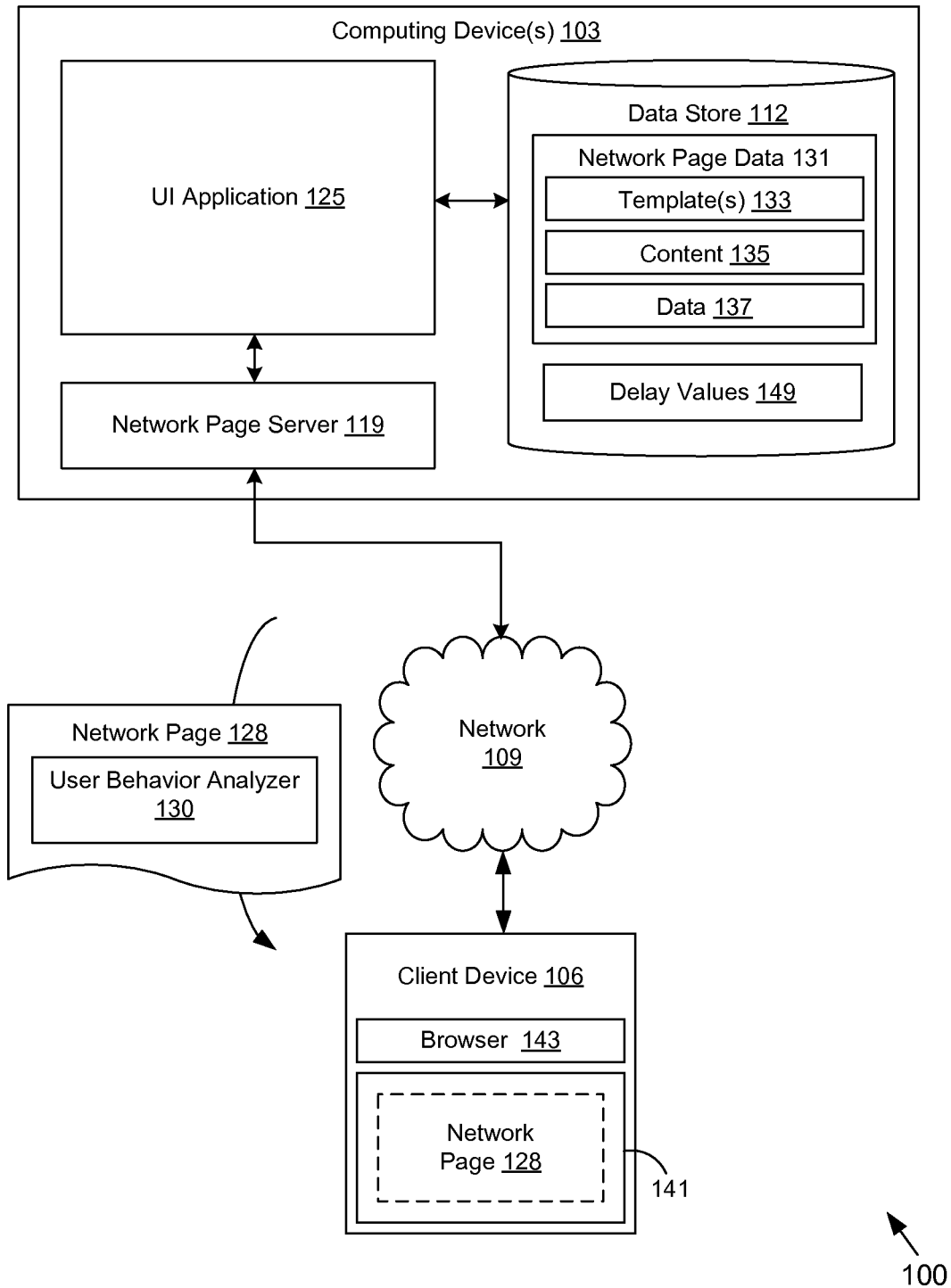
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a user interface (UI) application 125, a network page server 119, and other applications, services, processes, systems, engines, or functionality not discussed in detail herein. The UI application 125 is executed to provide browser access to content that is served over the network 109. The network page server 119 acts as a gateway through which requests are received from clients 106 and responses transmitted back to the clients 106. It is understood that other applications and components, such as, an application implementing the hypertext transport protocol, may be executed on the computing device 103 beyond those described herein.

The computing device 103 may, in some embodiments, provide many different applications that are executed to provide services offered by an online merchant, a search engine, or other services that involve delivering content over a network 109. For example, the computing device 103 may execute applications that facilitate the ordering of goods online by customers by manipulating a user interface generated by the UI application 125 on a client 106. The computing device 103 may also execute a search engine, search indexer, or other services, etc., that facilitates the functionality of a search engine.

The client device 106 is representative of a plurality of client devices 106 that may be coupled to the network 109. The client device 106 may comprise, for example, a processor-based system, such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106 includes a display device 141 upon which various network pages 128 and other content may be rendered. The display device 141 may comprise, for example, one or more devices such as cathode ray tubes (CRTs), liquid crystal display (LCD) screens, gas plasma-based flat panel displays, LCD projectors, or other types of display devices, etc.

The client device 106 may be configured to execute various applications, such as a browser application 143 and/or other applications. The browser 143 may be executed in a client device 106, for example, to access and render network pages 128 embodied as web pages, or other network content served up by the computing device 103 and/or other servers.

In accordance with various embodiments, a user on a client 106 can purchase and/or view items via network pages 128 by manipulating a user interface implemented within a network page 128 rendered on the client 106. An item may refer to a product, good, service, software download, multimedia download, social networking profile, or any combination, bundle, or package thereof, that may be offered for sale, purchase, rental, lease, download, and/or any other form of consumption as may be appreciated.

To facilitate the generating of network pages 128 with certain user interface elements placed in panels within the network pages 128, the data store 112 in the computing device 103 may store network page data 131, where the network page data 131 includes one or more network page templates 133 for a given user interface. Each template 133 may include corresponding content 135 and data 137 stored in the data store 112. The network page templates 133 act as templates of network pages, such as dynamic network pages that may ultimately be populated with the content 135 and data 137. In addition, it is possible that network pages 128 may be generated using other approaches.

The content 135 may, for example, specify user interface elements that are arranged in a network page, such as, but not limited to, imagery, a page header, form elements (e.g., text entry fields, buttons, etc.), panels, menus, and other user interface elements as can be appreciated. As contemplated herein, the data store 112 may be representative of many different data stores included in a given system. The data store 112 may comprise, for example, a database or other data storage structure.

The UI application 125 facilitates the generating of network pages 128 provided to clients 106 in response to input provided by the client 106 comprising, for example, placement of an input device pointer such as a mouse pointer on one or more network pages 128. The UI application 125 embeds user behavior analyzer 130 code within the network page 128, where the user behavior analyzer 130 is configured to analyze movement of the mouse pointer to determine, for example, whether to modify/update the network page 128 being displayed on a display device 141 on the client 106. As a non-limiting example, the user behavior analyzer 130 may determine, based on movement by the mouse pointer, that the user intends to navigate to an element in a sub-menu currently being displayed and therefore, continue to display the sub-menu rather than displaying a different sub-menu.

For some embodiments, the UI application 125 generates network pages 128 for transmission to a client 106 that includes an embedded user behavior analyzer 130 for analyzing motion by an input device pointer to determine, for example, whether to invoke certain sub-menus within the network page 128. The user behavior analyzer 130 monitors movement of an input device pointer associated with an input device (e.g., a mouse, a touchscreen, stylus, etc.). In one embodiment, the UI application 125 embeds the user behavior analyzer 130 in the form of Javascript code or other type of code in the network page 128 to accomplish the functions described above.

For some embodiments, the user behavior analyzer 130 embedded in the network page 128 may be configured to sample an input device pointer position on a periodic basis and analyze the behavior and/or tendencies of a user on the client 106 based on the user's interactions with a network page 128 that is encoded by the UI application 125.

Based on the movement of the input device pointer, the user behavior analyzer 130 determines the trajectory angle and traversal rate of an input device pointer controlled by a user. Based on this, for example, the user behavior analyzer 130 can determine or predict if the user intends to navigate the input device pointer to a sub-menu associated with an element in the first, main panel. As described in more detail below, the user behavior analyzer 130 may be configured to execute a delay based on the trajectory of the input device pointer.

The techniques disclosed herein allow a user to navigate an input device pointer from a main panel to a sub-panel without unintentionally triggering a different sub-panel associated with another element in the main panel. For some embodiments, delay values 149 are predetermined and stored in the data store 112, where the data values 149 may be predetermined as a function of the angle of traversal. Prior to executing a delay, the user behavior analyzer 130 retrieves a delay value from the data store 112. For some embodiments, the delay values 149 may be stored, for example, in the form of a look-up table or matrix in the data store 112 or embedded in the network page 128.

Figure 2A:
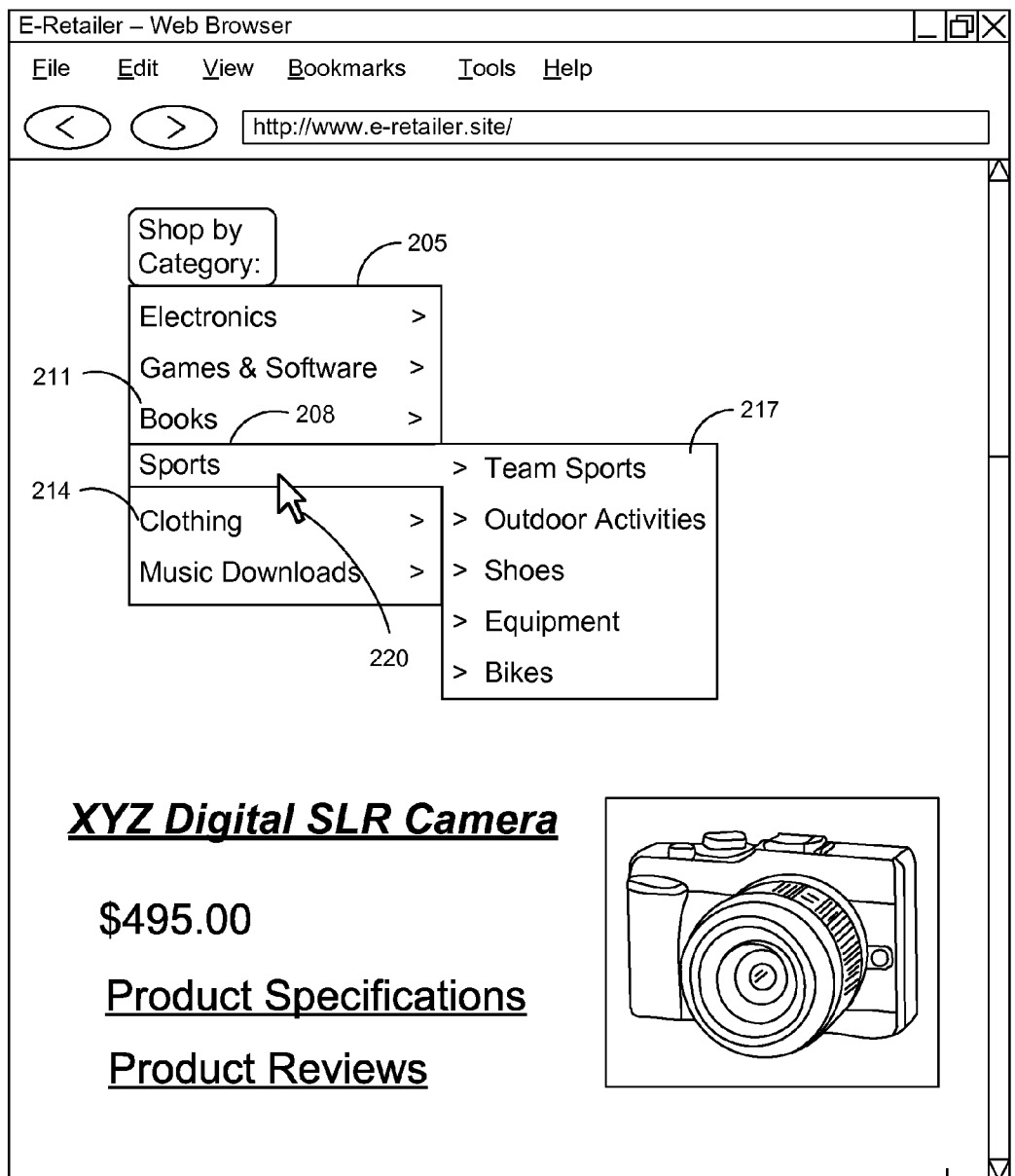
FIG. 2A-2B are drawings of an example of a user interface rendered by a client in the networked environment of FIG. 1 according to various embodiments of the present disclosure.

Shown in FIG. 2A is a network page 128 generated by the UI application 125 (FIG. 1) and transmitted to a client 106 (FIG. 1). In the illustrated example, the network page 128 may include client side code, such as JavaScript® code, that monitors movement by an input device pointer 220. The network page 128 shown is an example of a user interface commonly offered by online retailers to facilitate electronic commerce.

As shown, the network page 128 includes a main panel 205 that includes a series of elements 208, 211, 214, where the elements may be associated, for example, with a category of items. As described above, an item may refer to a product, good, service, software download, multimedia download, social networking profile, or any combination, bundle, or package thereof, that may be offered for sale, purchase, rental, lease, download, and/or any other form of consumption as may be appreciated.

By hovering an input device pointer 220 over one of the elements 208 in the main panel 205, a second, sub-panel 217 providing additional categories/elements is displayed to allow the user to narrow down a selection. As shown, the second panel 217 may similarly contain multiple elements. In this non-limiting example, only two panels 205, 217 are shown. As can be appreciated, the network page 128 may include additional levels of panels.

In general, traversing from the first panel 205 to the second panel 217 located on the right can cause unintentional triggering of other elements in the main panel 205 located along the input device pointer 220 trajectory path. To illustrate, reference is made to the non-limiting example in FIG. 2A. While moving the input device pointer 220 from the element labeled "Sports" in the first panel 205 to the element labeled "Shoes," the user may unintentionally trigger a sub-panel associated with another element in the first panel 205. In this illustration, for example, the user may unintentionally trigger a sub-panel associated with the element labeled "Clothing."

Figure 2B:
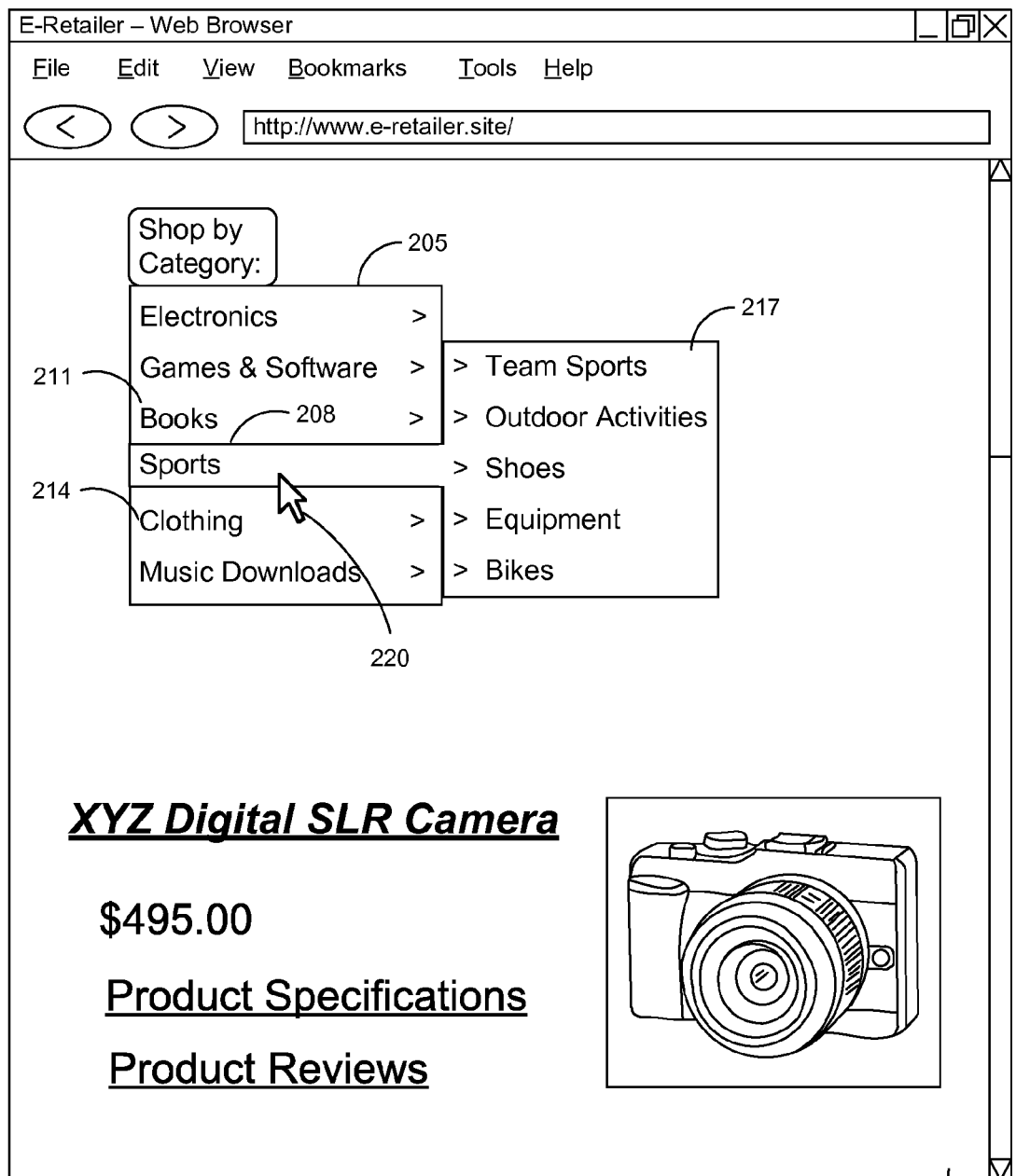

Note that while the top of the second panel 217 in the example shown is aligned with the element 208 selected (i.e., "Sports"), the various embodiments described may be applied to other configurations/layouts of sub-panels. For example, shown in FIG. 2B is the same network page 128 with the second panel 217 placed in a position such that the selected element in the first panel 205 is centralized with respect to the second panel 217. As can be appreciated, due to the layout shown in FIG. 2B, the user may unintentionally trigger a sub-panel associated with another element in the first panel 205, where the element is to the top or bottom of the selected element (i.e., the element labeled "Sports").

As described in detail below, for some embodiments, the user behavior analyzer 130 (FIG. 1) executes a delay prior to updating/modifying the network page 128, where updating/modifying the network page 128 may comprise, for example, invoking a different sub-panel 217 than the one shown. For some embodiments, the delay is a predetermined delay set according to a trajectory path with respect to a point of reference comprising a starting point of the input device pointer 220 on the first panel 205.

Figure 3:
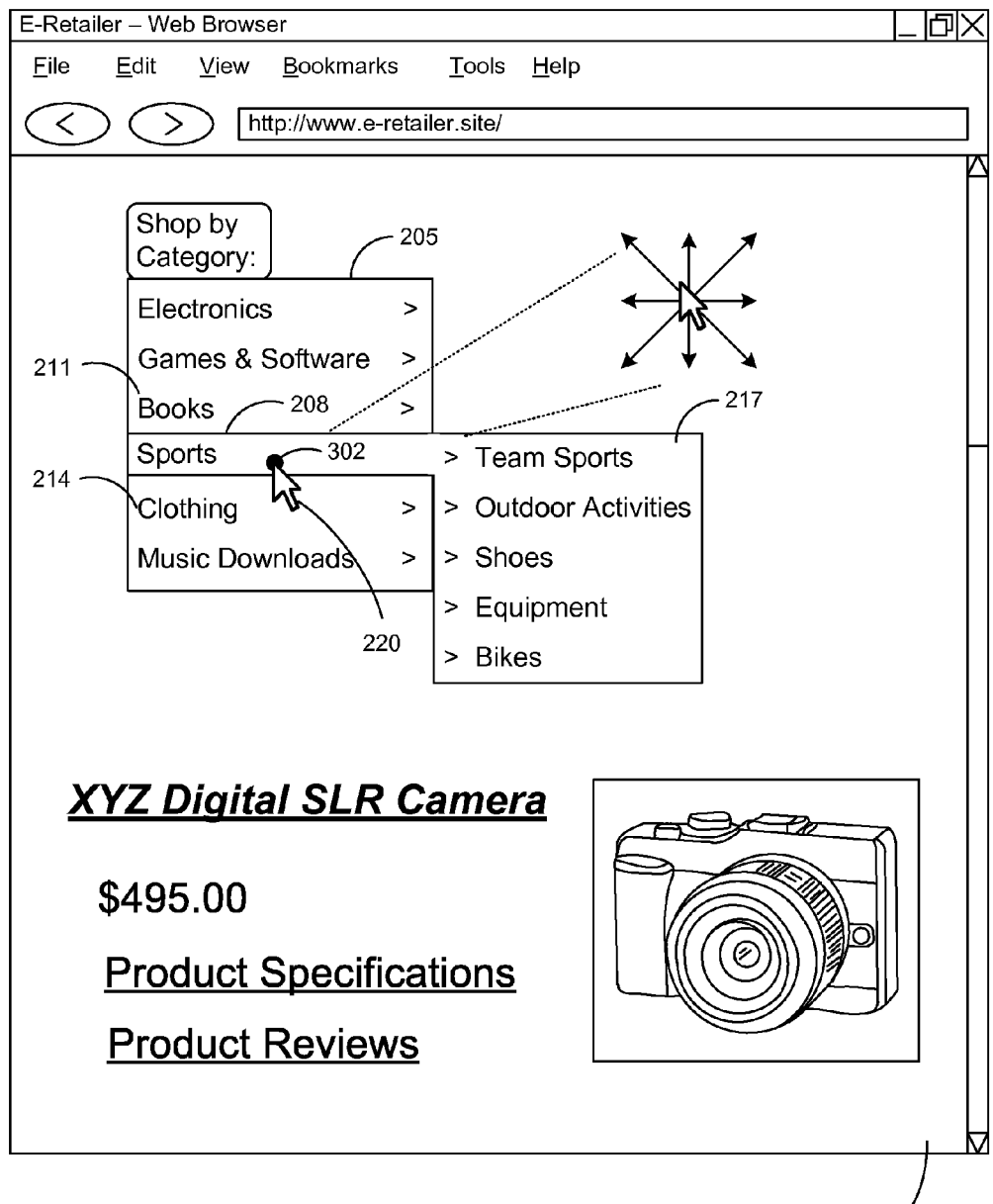
FIG. 3 is a drawing of an example of a user interface (UI) rendered by a client in the networked environment of FIG. 1 according to an embodiment of the present disclosure.

Shown in FIG. 3 is a starting point 302 of the input device pointer 220 used for determining the trajectory path of the input device pointer 220. For some embodiments, the trajectory is generally categorized according to a discrete number of directions comprising a north direction, south direction, east direction, west direction, northeast direction, southeast direction, northwest direction, and southwest direction (or in the alternative, an upward direction, a downward direction, a right direction, a left direction, an upper right direction, a lower right direction, an upper left direction, and a lower left direction). As described below, the delay executed by the user behavior analyzer 130 may be a function of the trajectory path.

In accordance with some embodiments, the direction that the input device pointer 220 is moving may be determined using a sliding window technique that calculates various distances. Specifically, mouse movement is sampled at an interval and points are stored in a sliding first-in first-out (FIFO) window of size n. At each interval, the first (i.e., "oldest") and last ("newest") points in the window are compared with the current point to determine mouse direction. The "newest" point is defined as the point sampled immediately before the current point of the input device pointer 220. The oldest point is dequeued from the window and the current point is enqueued to the window. Note that the oldest, newest, and current points may be the same value for various reasons including, for example, movement by the input device pointer 220 and the number of items currently stored in the window at the time of calculation.

The following is just one possible implementation for incorporating the sliding window technique. First, a window size is defined, and the x and y coordinates of the input device pointer 220 are monitored. A "newest" distance is then calculated based on the following:

$$\text{newest distance} = \sqrt{(\text{current}\_x - \text{newest}\_x)^2 + (\text{current}\_y - \text{newest}\_y)^2}.$$

An "oldest" distance is calculated based on the following:

$$\text{oldest distance} = \sqrt{(\text{current}\_x - \text{oldest}\_x)^2 + (\text{current}\_y - \text{oldest}\_y)^2}.$$

For some embodiments, if the newest distance is greater than a predetermined threshold, the newest distance is used and a reference point is set to the "newest" point. If the newest distance is not greater than the predetermined threshold, the oldest distance is used, and the reference point is set to the oldest point in the sliding window. Based on this, the direction may be derived as follows:

$$\text{direction} = \text{round}(\arctan(\text{current}\_y - \text{referencepoint}\_y, \text{current}\_x - \text{referencepoint}\_x) * 4/\pi) * 45.$$

If the magnitude of the distance is greater than a second predetermined threshold, then a determination is made on whether the direction is positive or negative. If the direction is a negative value, then a positive value of the direction is derived by multiplying the direction by a value of −1. If the direction is a positive value, the direction is calculated as (new) direction=360−direction. If the magnitude of the distance is not greater than the second predetermined threshold, then the direction is considered to be indeterminate. For some embodiments, a default delay is assigned for such cases.

Figure 4A:
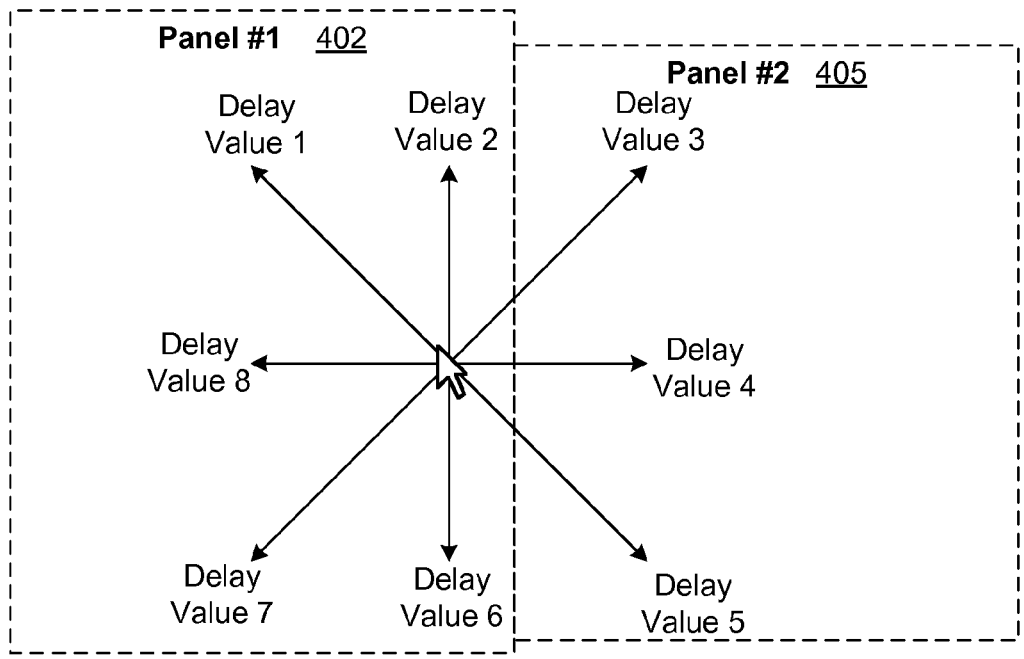
FIGS. 4A-4B illustrate an example of functionality implemented in the UI application in FIG. 1 according to an embodiment of the present disclosure.

FIG. 4A illustrates how delay values are assigned as a function of the direction. For some embodiments, the trajectory of the input device pointer 220 (FIG. 2A) is categorized according to one of eight directions. While extending the hover triggering delay according to a global, constant delay may address trajectory issues in certain directions (e.g., the northeast, east, and southeast direction), this can substantially slow down navigation of the input device pointer 220 in other directions (e.g., north and south). Therefore, various embodiments incorporate a variable delay value based on the location of a second panel 405 with respect to a first panel 402. Note that while eight directions are shown in the non-limiting example of FIG. 4A, the degree of granularity is not limited to eight directions. For example, delay values for up to three hundred and sixty degrees can be implemented as well.

Shown in FIG. 4A are two panels 402, 405 where the second panel 405 is located to the right of the first panel 402. In this non-limiting example, the delay values associated with trajectory paths towards the second panel 405 are assigned higher values to reduce the possibility of unintentionally triggering other panels. In this non-limiting example, delay values 3-5 are assigned a greater value than the remaining delay values (delay values 1, 2, and 6-8). The delay values are assigned according to placement of the panels 402, 405 with respect to one another. As another example, for user interfaces where the second panel 405 is placed on top of the first panel 402, the delay values corresponding to that direction (e.g., delay values 1-3) would be assigned a higher value relative to the remaining delays values.

Figure 4B:
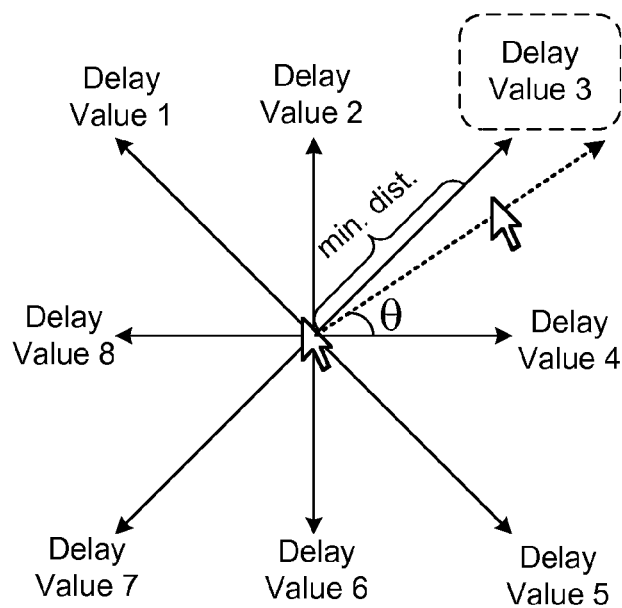

As shown in FIG. 4B, for some embodiments, the trajectory path of the input device pointer 220 (FIG. 2A) is categorized according to the closest direction (the north direction, south direction, east direction, west direction, northeast direction, southeast direction, northwest direction, and southwest direction). In the example shown, based on the angle of traversal by the input device pointer 220, the user behavior analyzer 130 (FIG. 1) retrieves delay value 3 from among the delay values 149 (FIG. 1) stored in the data store 112 (FIG. 1) of the computing device 103 (FIG. 1) and executes a delay equal to this value.

For some embodiments, the user behavior analyzer 130 also determines whether the input device pointer 220 traverses a minimum distance from the starting point 302 (FIG. 3) of the input device pointer 220. For example, in some cases, the user may move the input device pointer 220 in the direction of the second panel 217 (FIG. 2A) but such that the input device pointer 220 stays within the first panel 205 (FIG. 2B) when the delay period expires. In such cases, even though the input device pointer 220 is moving in the direction of the second panel 217, the user behavior analyzer 130 determines that the user intends to select another element in the first panel 205 (FIG. 2A) and invoke another panel other than the panel 217 already being displayed.

For example, the user behavior analyzer 130 may modify the user interface to display a panel associated with the element immediately above the current element. For other embodiments, the user behavior analyzer 130 may also examine the traversal rate of the input device pointer 220. If the traversal rate meets or exceeds a minimum threshold rate, the user behavior analyzer 130 may determine that the user intends to navigate to the second panel 217 currently being shown. In contrast, the user behavior analyzer 130 may determine that slow movement of the input device pointer 220 indicates that the user intends to navigate to a different element in the first panel 205.

In some cases where the trajectory angle of the input device pointer 220 is not discernible (due, for example, to a tight, spiraling motion by the input device pointer 220), a default delay value may be retrieved and executed by the user behavior analyzer 130. By executing a delay, the user behavior analyzer 130 allows the user to traverse the input device pointer 220 to its intended destination without unintentionally triggering another panel.

Figure 5A:
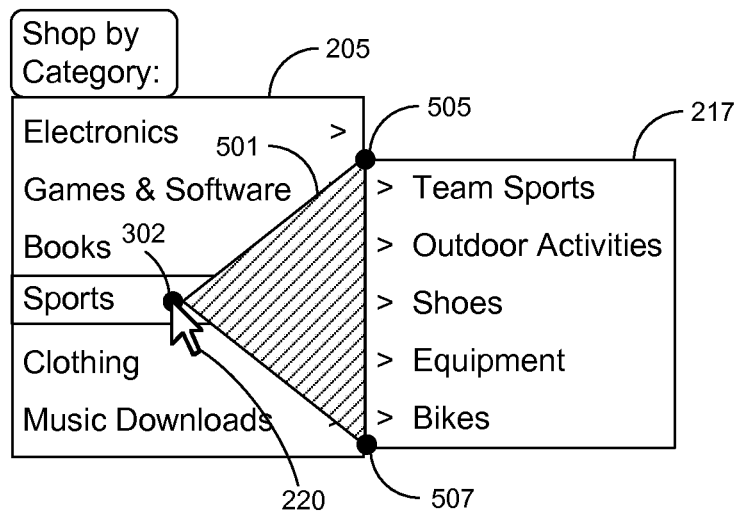
FIGS. 5A-5B illustrate another example of functionality implemented in the UI application in FIG. 1 according to an embodiment of the present disclosure.

Shown in FIG. 5A is an alternative embodiment for reducing unintentional triggering of panels. For some embodiments, a triangle technique is implemented whereby a triangular region 501 is defined based on an initial starting point 302 of the input device pointer 220 and corners 505, 507 of the second panel 217. Generally, the triangle technique comprises two aspects: 1) scenarios where the input mouse pointer 220 moves a minimum distance (i.e., characterized as "ordinary movement"); and 2) scenarios where the input mouse pointer 220 only moves an incremental distance where the trajectory angle is not discernible (i.e., "small movement"). The first aspect relates to typical input device pointer 220 movements that involve traversing across more than one pixel at a time, whereas the second aspect generally relates to very small movements by input device pointer 220 typically on the order of less than one pixel.

Figure 5B:
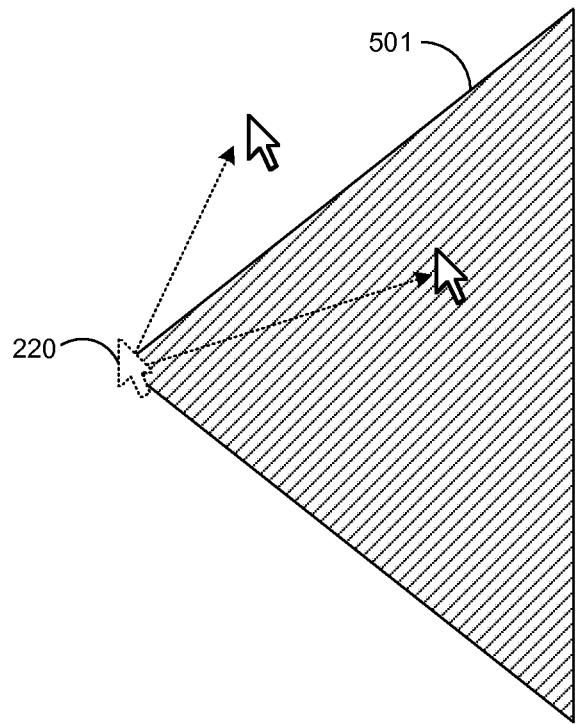

For scenarios in which the input mouse pointer 220 moves more than one pixel (i.e., "ordinary movement"), a triangular region 501 is defined based on the initial position 302 of the input device pointer 220. The other two vertices comprise corners 505, 507 of the second panel 217 closest to the first panel 205. FIG. 5B illustrates movement of the input device pointer 220 inside and outside the triangular region 501. If the input device pointer 220 remains in the triangular region 501, the user behavior analyzer 130 (FIG. 1) determines that the user intends to navigate the input device pointer 220 to an element in the second panel 217 (FIG. 5A). Based on this, the user behavior analyzer 130 executes a delay, thereby providing the user more time to move the input device pointer 220 to its final destination.

For embodiments utilizing the triangle technique, a constant delay value may be utilized. If the input device pointer 220 moves again before the delay period expires, the user behavior analyzer 130 repeats the calculation and determines again whether the input device pointer 220 is moving towards the second panel 217 currently being displayed. For this second calculation, a new triangular region is defined based on the current position of the input device pointer 220 and the corners 505, 507 (FIG. 5A) of the second panel 217 currently being displayed. The process is repeated until the input device pointer 220 eventually falls outside the newly calculated triangle or the input device 220 pointer stops moving.

If the input device pointer 220 stops moving or falls outside the triangular region 501 but is still in the first menu 205 area, the UI application 125 updates/modifies the user interface to display a different, second panel than the second panel 217 previously shown. In this scenario, the user behavior analyzer 130 determines that the user intends to select a new element within the first panel 205. If the input device pointer 220 falls outside the triangular region 501 but is now inside the second panel 217, the UI application 125 does not update/modify the user interface. Instead, the original, second panel 217 remains on the user interface.

Note that while the example shown in FIGS. 5A and 5B depict the second panel 217 being placed to the right of the first panel 205, the triangle technique described above may also be implemented for any panel layout (e.g., left/right, right/left, top/bottom, bottom/top).

If the input device pointer 220 movement is very small (e.g., on the order of only one pixel), the user behavior analyzer 130 may need to examine the prior positions of the input device pointer 220. This additional step is performed because coordinates for input device pointers 220 and other display elements are divided into discrete square units (i.e., pixels), and a meaningful triangle calculation is not possible at such small scales.

Figure 6:
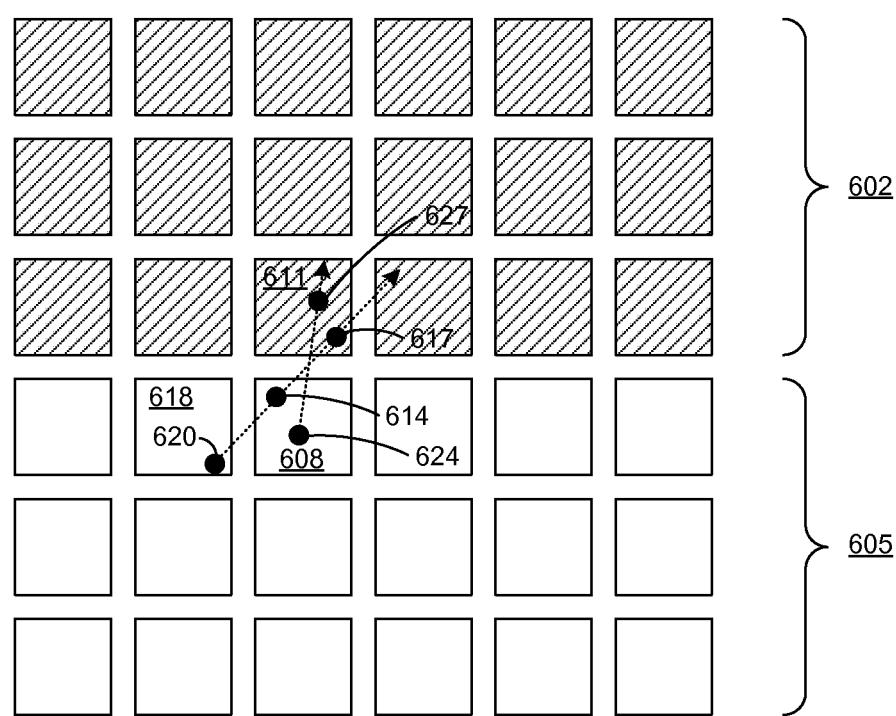
FIG. 6 illustrates an exploded view of a user interface such as the user interfaces of FIGS. 2A, 2B, or FIG. 3 at the pixel level according to an embodiment of the present disclosure.

To illustrate, reference is made to FIG. 6, which illustrates an exploded view of a user interface at the pixel level. Suppose that the shaded pixels shown are associated with one element 602 and that the pixels below are associated with a different element 605. Assume for this illustration that pixel 611 contains the current position 627 of the input device pointer 220 (FIG. 2A) and that pixel 608 contains the prior position 624 of the input device pointer 220. FIG. 6 shows how the trajectory angle may differ based on the position of the input device pointer 220 in the two pixels 608, 611. In one scenario, positions 614, 617 of the input device pointer 220 define one trajectory angle, while positions 624, 627 define a different trajectory angle even though both sets of positions occupy the same two pixels 608, 611.

To address such scenarios, the user behavior analyzer 130 (FIG. 1) examines other prior positions of the input device pointer 220. In accordance with such embodiments, the user behavior analyzer 130 looks at the current position 617 (position[n]) of the input device pointer 220 in addition to the two prior positions (position[n−1] and position[n−2]). As shown in FIG. 6, the position 620 (position[n−2]) of the input device pointer 220 prior to position 614 (position[n−1]) is located in pixel 618. The user behavior analyzer 130 examines the coordinates of the prior position 614 to determine if the x-coordinate is unchanged and if the y-coordinate has only moved by one pixel relative to the current position 617 (position[n]). If this applies, the user behavior analyzer 130 examines the position 620 prior to the last position 614 (i.e., the "two-prior" position) and determines if the x-coordinate of the (two-prior) position 620 is less than the x-coordinate of the current position 617. If this applies, a short delay is executed and the user behavior analyzer 130 attempts to perform the triangle technique associated with ordinary movement. If the x-coordinate of two-prior position is the same as or greater than the x-coordinate of the current position 617, then the triangle technique associated with ordinary movement is performed without any delay. Note again that the small movement technique may be implemented for any panel layout (e.g., left/right, right/left, top/bottom, bottom/top).

Figure 7:
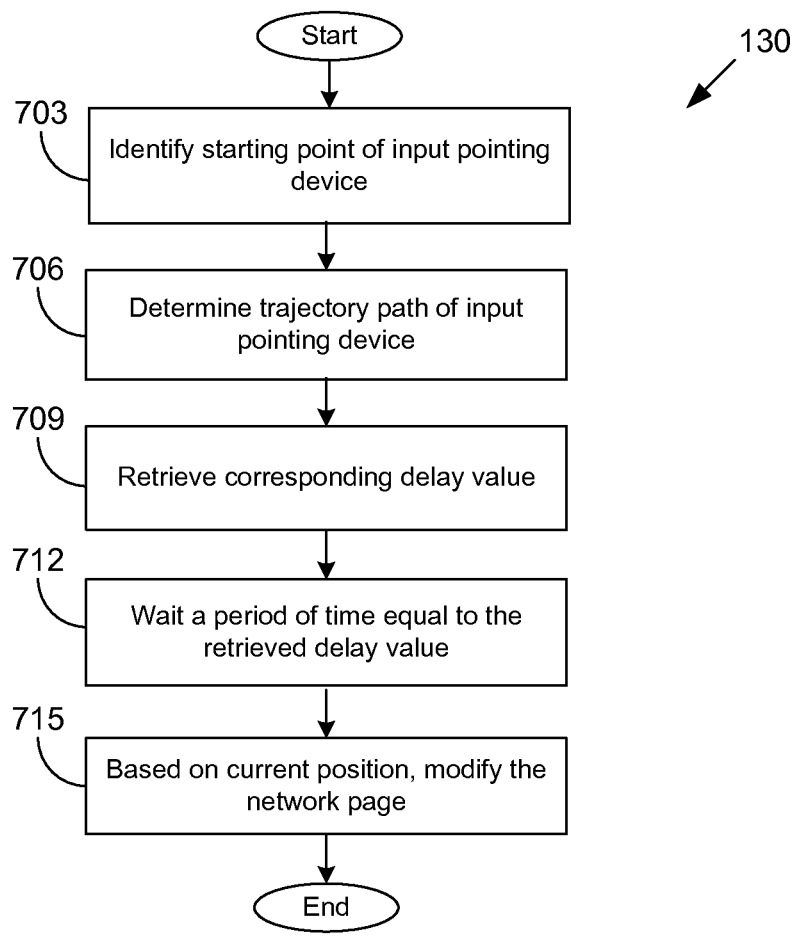
FIGS. 7-8 are flowcharts illustrating examples of functionality implemented as portions of the user behavior analyzer executed in a client device in the networked environment of FIG. 1 according to various embodiments of the present disclosure.

Referring next to FIG. 7, shown is a flowchart that provides one example of the operation of the user behavior analyzer 130 (FIG. 1) according to various embodiments. It is understood that the flowchart of FIG. 7 provides merely an example of the many different types of functional arrangements that may be employed to implement the operation of the user behavior analyzer 130 as described herein. As an alternative, the flowchart of FIG. 7 may be viewed as depicting an example of steps of a method implemented in the computing device 103 (FIG. 1) according to one or more embodiments. The user behavior analyzer 130 is executed in the client 106 (FIG. 1).

Beginning with box 703, the user behavior analyzer 130 identifies the starting point 302 (FIG. 3) of the input pointing device 220 (FIG. 2A) within a network page 128 (FIG. 2A) displayed on the client 106. In box 706, the user behavior analyzer 130 determines the trajectory path of the input pointer device 220. In box 709, the user behavior analyzer 130 retrieves a delay value based on the determined trajectory path. In box 712, the user behavior analyzer 130 waits a period of time equal to the retrieved delay value. In box 715, the user behavior analyzer 130 modifies the network page 128 based on the current position of the input device pointer 220. Thereafter the user behavior analyzer 130 ends as shown.

Figure 8:
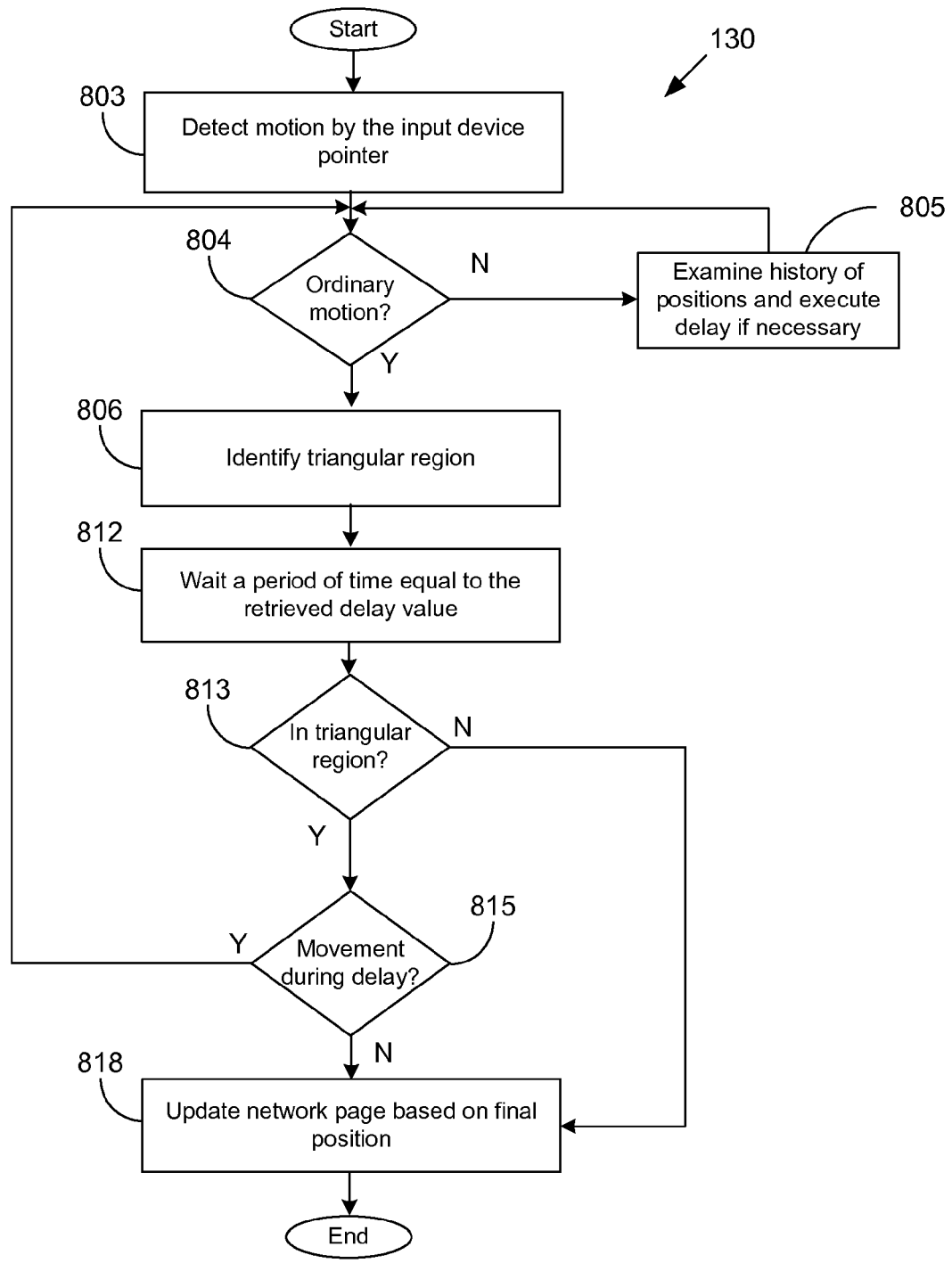

Referring next to FIG. 8 shown is a flowchart that provides one example of the operation of the user behavior analyzer 130 (FIG. 1) according to alternative embodiments. It is understood that the flowchart of FIG. 8 provides merely an example of the many different types of functional arrangements that may be employed to implement the operation of the user behavior analyzer 130 as described herein. As an alternative, the flowchart of FIG. 8 may be viewed as depicting an example of steps of a method implemented in the computing device 103 (FIG. 1) according to one or more embodiments. The user behavior analyzer 130 is executed in the client 106 (FIG. 1).

Beginning with box 803, the user behavior analyzer 130 detects motion by the input device pointer 220 (FIG. 2A). In box 804, the user behavior analyzer 130 determines whether the motion by the input device pointer 220 may be categorized as "ordinary movement" or "small movement," described above. For ordinary movement, the user behavior analyzer 130 identifies a triangular region 501 (FIG. 5A) (box 806).

In box 812, the user behavior analyzer 130 waits a period of time equal to a predetermined delay value. In box 813, a determination is made on whether the input device pointer 220 is still within the triangular region. If the input device pointer 220 is no longer within the triangular region, then the user behavior analyzer 130 proceeds to box 818, where the network page is updated based on the final position of the input device pointer 220. If the input device pointer 220 is still within the triangular region, then the user behavior analyzer 130 proceeds to box 815. In box 815, if the input device pointer 220 moves again prior to expiration of the delay, then the user behavior analyzer 130 proceeds back to box 804. If the input device pointer 220 does not move prior to expiration of the delay, then in box 818, the user behavior analyzer 130 updates the network page based on the final position of the input device pointer 220.

Referring back to box 804, if the motion by the input device pointer 220 is categorized as small movement (box 805), the user behavior analyzer 130 examines the two prior positions with respect to the current position of the input device pointer 220, as described above. If necessary, the user behavior analyzer 130 waits a period of time equal to a predetermined delay and then proceeds back to box 804 to determine whether the motion by the input device pointer 220 may be categorized as ordinary movement.

Figure 9:
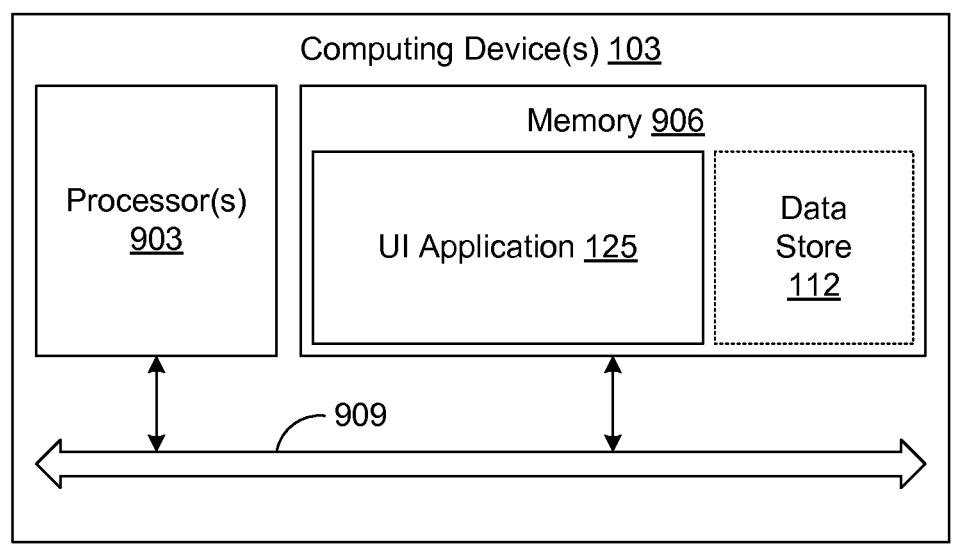
FIG. 9 is a schematic block diagram that provides one example illustration of a computing device employed in the networked environment of FIG. 1 according to various embodiments of the present disclosure.

With reference to FIG. 9, shown is a schematic block diagram of the computing device 103 according to an embodiment of the present disclosure. The computing device 103 includes at least one processor circuit, for example, having a processor 903 and a memory 906, both of which are coupled to a local interface 909. To this end, the computing device 103 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is the UI application 125 and potentially other applications. Also stored in the memory 906 may be a data store 112 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the UI application 125 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows an example of functionality of an implementation of the UI application 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the UI application 125 that comprises software or code can be embodied in any non-transitory computer-readable medium for use by or in connection with an instruction execution system such as, for example, a processor in a computer system or other system. In this sense, each may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein the program comprises a set of instructions that cause the computing device to at least:
   retrieve an encoded network page, the encoded network page containing at least a first panel and a second panel;
   render the network page containing the first panel and the second panel for display, the first panel containing a plurality of elements and the second panel being displayed in response to a mouse pointer hovering over an element among the plurality of elements in the first panel;
   monitor movement of the mouse pointer within the network page;
   identify an angle of traversal of the mouse pointer, the angle of traversal being defined with respect to an initial position located on the element among the plurality of elements in the first panel;
   retrieve a predetermined delay according to the angle of traversal;
   continue to render the second panel associated with said element for display until a period of time associated with the angle of traversal exceeds the predetermined delay; and
   modify the network page according to a current position of the mouse pointer upon expiration of the predetermined delay.

2. The non-transitory computer-readable medium of claim 1, wherein the instructions that cause the computing device to at least retrieve the predetermined delay according to the angle of traversal cause the computing device to at least retrieve the predetermined delay from a look-up table storing a plurality of predetermined delays.

3. A system, comprising:
- at least one computing device comprising a processor and a memory; and
- an application comprising a set of instructions stored in the memory of the at least one computing device, wherein the set of instructions, when executed with the processor of the at least one computing device, cause the at least one computing device to at least:
  - render a user interface containing a first panel for display;
  - display a second panel in the user interface when an input device pointer hovers over an element in the first panel;
  - determine a trajectory path of an input device pointer;
  - retrieve a delay value according to the trajectory path;
  - continue to display the second panel associated with said element in the user interface until a period of time associated with the trajectory path exceeds the delay value; and
  - modify the user interface according to the delay value and a current position of the input device pointer.

4. The system of claim 3, wherein the delay value is a predetermined delay set according to the trajectory path with respect to a point of reference comprising a starting point of the input device pointer within the first panel.

5. The system of claim 4, wherein the trajectory path with respect to the point of reference relates to one of: an upward direction, a downward direction, a right direction, a left direction, an upper right direction, a lower right direction, an upper left direction, and a lower left direction.

6. The system of claim 4, wherein delay values associated with the trajectory path extending from the first panel to the second panel are greater than delay values associated with an opposite direction.

7. The system of claim 3, wherein the instructions that cause the at least one computing device to modify the user interface according to the delay value and the current position of the input device pointer comprise additional instructions that adjust a display of the second panel when the input device pointer moves to an area corresponding to the second panel in a period of time greater than the delay value.

8. The system of claim 3, wherein the instructions that cause the at least one computing device to modify the user interface according to the delay value and the current position of the input device pointer comprise additional instructions that cause the at least one computing device to adjust a display of the second panel when the input device pointer moves to an area corresponding to the first panel in a period of time greater than the delay value.

9. The system of claim 3, wherein the instructions that cause the at least one computing device to modify the user interface according to the delay value and the current position of the input device pointer comprise additional instructions that cause the at least one computing device to adjust a display of the second panel if the input device pointer does not traverse a minimum distance.

10. The system of claim 3, wherein the instructions that cause the at least one computing device to retrieve the delay value according to the trajectory path comprise additional instructions that cause the at least one computing device to retrieve the delay value from a listing of predetermined delays values, wherein each of the predetermined delay values is associated with an angle.

11. The system of claim 10, wherein the instructions that cause the at least one computing device to modify the user interface according to the delay value and the current position of the input device pointer comprise additional instructions that cause the at least one computing device to modify the user interface according to a rate of traversal of the input device pointer with respect to a threshold rate.

12. The system of claim 3, wherein the instructions that cause the at least one computing device to retrieve the delay value according to the trajectory path comprise additional instructions that cause the at least one computing device to retrieve a default delay value if the trajectory path of the input device pointer cannot be determined.

13. The system of claim 3, wherein the first panel and the second panel each comprise a plurality of elements used for facilitating purchase of at least one item from an electronic commerce system.

14. The system of claim 3, wherein the instructions that cause the at least one computing device to retrieve the delay value according to the trajectory path comprises additional instructions that cause the at least one computing device to retrieve the delay value from a look-up table containing predetermined delay values, the predetermined delay values corresponding to a direction of traversal by the input device pointer.

15. A method, comprising:
- rendering, via a computing device, a user interface containing a first panel for display;
- displaying, via the computing device, a second panel in the user interface when an input device pointer hovers over an element in the first panel;
- determining, via the computing device, a trajectory path of an input device pointer;
- retrieving, via the computing device, a delay value according to the trajectory path;
- continuing, via the computing device, to display the second panel associated with said element in the user interface until a period of time associated with the trajectory path exceeds the delay value; and
- modifying, via the computing device, the user interface according to the delay value and a current position of the input device pointer.

16. The method of claim 15, wherein the delay value is a predetermined delay set according to the trajectory path with respect to a point of reference comprising a starting point of the input device pointer within the first panel.

17. The method of claim 16, wherein the trajectory path with respect to the point of reference relates to one of: an upward direction, a downward direction, a right direction, a left direction, an upper right direction, a lower right direction, an upper left direction, and a lower left direction.

18. The method of claim 16, wherein delay values associated with the trajectory path extending from the first panel to the second panel are greater than delay values associated with an opposite direction.

19. The method of claim 15, wherein the first panel and the second panel each comprise a plurality of elements used for facilitating purchase of at least one item from an electronic commerce system.

20. The method of claim 15, wherein modifying, via the computing device, the user interface according to the delay value and the current position of the input device pointer further comprises adjusting, via the computing device, a display of the second panel in response to determining that the input device pointer has moved to an area corresponding to the first panel in a period of time greater than the delay value.

21. The method of claim 15, wherein modifying, via the computing device, the user interface according to the delay value and the current position of the input device pointer further comprises adjusting, via the computing device, a display of the second panel in response to determining that the input device pointer has moved to an area corresponding to the second panel in a period of time greater than the delay value.

* * * * *